(12) United States Patent
Di Cairano et al.

(10) Patent No.: US 10,668,931 B2
(45) Date of Patent: Jun. 2, 2020

(54) CONTROLLING SYSTEM SUBJECT TO PARTIALLY HIDDEN ACTUATOR DYNAMICS

(71) Applicant: Mitsubishi Electric Research Laboratories, Inc., Cambridge, MA (US)

(72) Inventors: Stefano Di Cairano, Newton, MA (US); Tobias Baethge, Magdeburg (DE); Rolf Findeisen, Magdeburg (DE)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 0 days.

(21) Appl. No.: 15/998,815

(22) Filed: Aug. 16, 2018

(65) Prior Publication Data

US 2020/0055523 A1 Feb. 20, 2020

(51) Int. Cl.
*B60W 50/04* (2006.01)
*B60W 50/00* (2006.01)

(52) U.S. Cl.
CPC ... *B60W 50/045* (2013.01); *B60W 2050/0026* (2013.01); *B60W 2050/0083* (2013.01)

(58) Field of Classification Search
CPC .............. B60W 2050/0026; B60W 2050/0083
USPC .......................................................... 701/36
See application file for complete search history.

(56) References Cited

U.S. PATENT DOCUMENTS 6,151,539 A 11/2000 Bergholz et al.
9,733,629 B2 8/2017 Lu
2004/0107013 A1 6/2004 Fuller et al.
2006/0064291 A1* 3/2006 Pattipatti ............ G05B 23/0251
703/14
2009/0254202 A1 10/2009 Pekar et al.
2013/0190898 A1 7/2013 Shilpiekandula et al.
2015/0112512 A1* 4/2015 Fan ......................... H04L 67/12
701/2

(Continued)

OTHER PUBLICATIONS

Carvalho, Ashwin Mark et al. "Predictive Control under Uncertainty for Safe Autonomous Driving: Integrating Data-Driven Forecasts with Control Design." UC Berkeley Electronic Theses and Dissertations. 2016.

*Primary Examiner* — Atul Trivedi
(74) *Attorney, Agent, or Firm* — Gennadiy Vinokur; James McAleenan; Hironori Tsukamoto

(57) ABSTRACT

A controller is configured to control a system by generating a control input to an actuator changing a state of the system in accordance with the control input. The controller includes an interface configured to receive data indicative of dynamic response of the actuator and a tuner configured to determine the maximum rate of change of the control input during a control cycle using the received data indicative of dynamic response of the actuator. The controller also includes a receiver configured to receive measurements of the state of the system and a solver configured to determine a current value of the control input for controlling the controlled system based on the state of the controlled system subject to constraints on operation of the system and a constraint on the maximum rate of change of the control input, and to cause the actuator to change the state of the system according to the current value of the control input.

20 Claims, 13 Drawing Sheets

(56) References Cited

U.S. PATENT DOCUMENTS

| | | | |
|---|---|---|---|
| 2015/0119189 A1* | 4/2015 | Okubo | B60W 10/06 477/3 |
| 2015/0361915 A1* | 12/2015 | Sujan | F02D 9/02 701/54 |
| 2016/0025028 A1* | 1/2016 | Vaughan | F02D 41/263 701/105 |
| 2016/0046286 A1* | 2/2016 | Jeong | B60W 30/045 701/37 |
| 2018/0093659 A1* | 4/2018 | Fukuda | B60W 10/26 |
| 2018/0290665 A1* | 10/2018 | Hu | G05B 19/042 |
| 2019/0127049 A1* | 5/2019 | Blanding | B64C 9/00 |
| 2019/0317516 A1* | 10/2019 | Zhu | B62D 15/025 |

* cited by examiner

CONTROLLING SYSTEM SUBJECT TO PARTIALLY HIDDEN ACTUATOR DYNAMICS

TECHNICAL FIELD

This invention is related to a system control changes the state of the system using actuators.

BACKGROUND

For controlling a system such as a vehicle to achieve desired objectives, a controller issues commands in the form of control inputs that are aimed at modifying the behavior of the system, e.g., the steering angle of the wheels modifying the yaw rate of a running car. Example of the desired objectives are to follow a specified path, called a reference, or to achieve a specific point, called a target. Examples of the control inputs are the angle and speed of the shaft of an electric motor, the torque of a combustion engine, the position of a linear valve, the angle of a steering mechanism. Furthermore, the system may be subject to constraints, due to physical, legal, or specification requirements, such as maximum voltages, maximum and minimum velocities, or maximum difference between the reference and the actual machine position.

The control inputs produced by the controller are received from one or more actuation mechanisms, e.g., the electric motor of a power steering system, that enacts them by modifying additional physical quantities, such as the voltage or current in an electric motor, the airflow or pressure in an engine. These additional physical quantities are usually not considered in the controller. For instance, the steering angle control input of a vehicle may be enacted by an electric motor in the steering column by manipulating the motor current to cause a rotational motion of the steering column, which then results in movement of the steering rack. The controller commands an angle of the steering wheels, the actuating electric motor first increases and then decreases the electric current to align the wheels are aligned with the commanded steering angle.

In general, the control input sent to the actuation mechanisms is not instantaneously executed. This is due to the actuation mechanism requiring a certain amount of time to achieve the commands due to the internal dynamics associated with the additional physical quantities, called internal dynamics. For instance, the electric motor needs time to modify the current and to rotate the steering column from its current angle to the angle that aligns the steering wheels with the value indicated in the control input. Similarly, a combustion engine needs time to achieve the torque value indicated in a control input by increasing the pressure in the intake manifold, and a stepper motor may take some time to achieve the valve opening value indicated in a control input by applying voltage pulses.

Thus, the expected behavior of the system reacting immediately to the control inputs, and the actual behavior of the system reacting to control inputs through the effects of the actuators may be different. In the art this problem is often addressed by: (1) designing the actuator such that the time for actuating the control input is negligible with respect to the motion of the machine, (2) ignoring such difference and correcting the error afterwards by means of feedback, (3) accounting for the way the actuation mechanism operates in the control algorithm. However, (1) imposes some limitations on the way the actuation mechanism is designed, which may not be possible to enforce if the actuator is already provided, (2) may cause errors that cannot be recoverable by feedback, such as violation of system constraints which endanger the system operation, and (3) may not be possible due to the details of the actuation mechanism being unavailable, because provided by third parties, and in any case requires controller re-design should the actuator change.

As such there is need for a method that makes the controller tunable to the actuators, so that the controller accounts for the deviation from the expected behavior due to the actuator operation.

SUMMARY

It is an object of one embodiment to provide a controller for controlling a system subject to constraints without considering behavior of the actuator acting on the controlled system. For instance, consider an example where the controller needs to ensure that the trajectory of the vehicle is always on the drivable road within the boundaries. The controller issues a control input that would keep the expected vehicle trajectory on the road if the steering angle were equal to the control input. However, due to the unaccounted response of the actuator in making the steering angle achieve the control input value, the actual vehicle trajectory may exit from the drivable road delimited by boundaries with critical consequences.

Some embodiments are based on recognition that this problem can be addressed by making the controller designed for a specific implementation of the actuator. For example, the controller can be made aware of the internal dynamics of the actuator and of the evolution of the internal state of the actuator, continuously during the actuator operation. However, this creates some challenges because measuring the internal state of the actuator may require additional sensors, may be proprietary to a third party which does not want to make it available, and may cause more complex computations to be carried out by the controller to compute the control input. This may also cause the need to an extensive re-design of the controller, should the actuator change.

To that end, it is an object of some embodiments to make the controller tunable, i.e., adaptable for different types of the actuator. For example, in some embodiments, the controller is adaptable to different types of the motor controlling the steering column of the vehicle. Specifically, one embodiment discloses a controller tunable to different types of the actuators without knowing internal states of the actuators.

Some embodiments are based on recognition that it is possible to consider an abstract system where the actuator is not included, but instead the controlled system is subject to an additive disturbance. In this formulation, instead of detailed knowledge of the internal dynamics and internal state of the actuator, only a general information on the range of the disturbance is required, which can be served to select a tunable parameter in the controller. Different types of actuators cause different disturbance and thereby result in different values of the parameter. In such a manner, the tunable parameter acts as a tuning knob adapting the controller to different types of the actuator.

Some embodiments are based on recognition that the disturbance acting on the system is representative of the dynamic response of the actuator, i.e., the relation between the history of input signal to the actuator, being the control input, and the history of output signal of the actuator, being the system input. On the controller side, the tunable parameter can be the maximum rate of change of the control input during the control cycle, that is, how much the control input is allowed to change during a control cycle. In addition, selection of the rate of change of the control input as a tunable parameter allows to design the controller to be tunable to different types of actuators and to guarantee the enforcement of the system constraints and of the objective of the control, while receiving only a minimal information about the actuator itself.

Accordingly, one embodiment discloses a controller configured to control a system by generating a control input to an actuator changing a state of the system in accordance with the control input. The controller includes an interface configured to receive data indicative of dynamic response of the actuator; a tuner configured to determine the maximum rate of change of the control input during a control cycle using the received data indicative of dynamic response of the actuator; a receiver configured to receive measurements of the state of the system; and a solver configured to determine a current value of the control input for controlling the controlled system based on the state of the controlled system subject to constraints on operation of the system and a constraint on the maximum rate of change of the control input, and to cause the actuator to change the state of the system according to the current value of the control input.

Another embodiment discloses a method to control a system by generating a control input to an actuator changing a state of the system in accordance with the control input, wherein the method uses at least one processor coupled with stored instructions implementing the method, wherein the instructions, when executed by the processor carry out steps of the method, including receiving data indicative of dynamic response of the actuator; determining the maximum rate of change of the control input during a control cycle using the data indicative of dynamic response of the actuator; receiving measurements of the state of the system; determining a current value of the control input for controlling the controlled system based on the state of the controlled system subject to constraints on operation of the system and a constraint on the maximum rate of change of the control input; and causing the actuator to change the state of the system according to the current value of the control input.

Yet another embodiment discloses a non-transitory computer readable storage medium embodied thereon a program executable by a processor for performing a method, the method includes receiving data indicative of dynamic response of the actuator; determining the maximum rate of change of the control input during a control cycle using the data indicative of dynamic response of the actuator; receiving measurements of the state of the system; determining a current value of the control input for controlling the controlled system based on the state of the controlled system subject to constraints on operation of the system and a constraint on the maximum rate of change of the control input; and causing the actuator to change the state of the system according to the current value of the control input.

DETAILED DESCRIPTION

Figure 1A:
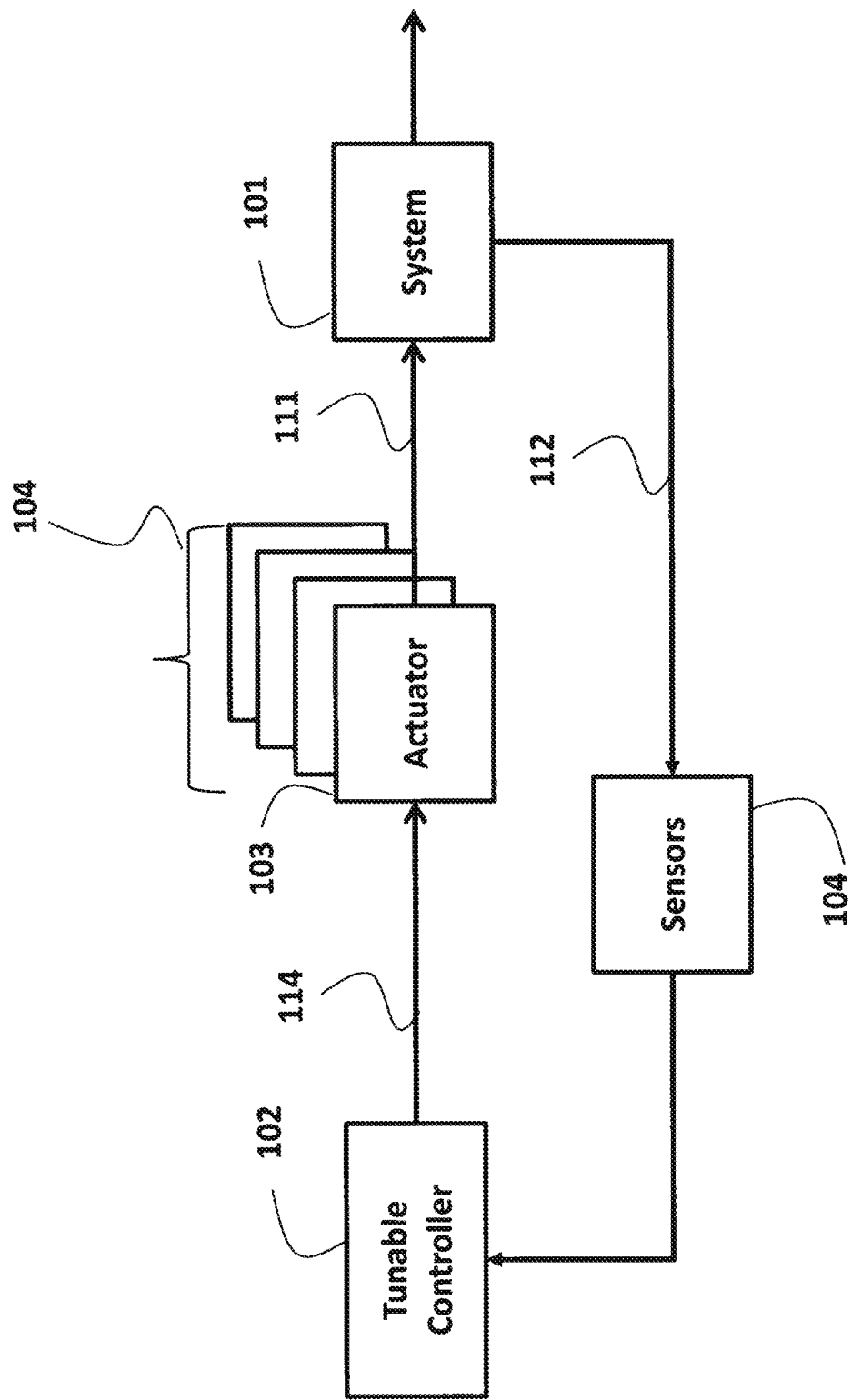
FIG. 1A shows a control system according to some embodiments.

FIG. 1A shows a control system according to some embodiments. A system 101 is a machine under control of a controller 102. The system 101 receives a system input 111, and produces an output 112 that is measured by sensors 103. The system 101 has a state. A state is the minimal amount of information that, when known at some instant with the additional knowledge of the values of the inputs, allows to uniquely and exactly describe the future evolution of the system outputs. The state of a system can be reconstructed from the system output that is measured by the sensors 103.

A controller 102 is a device that controls the system 101 to achieve a desired objective of the control usually represented as a reference signal, being a target for the system state or output. The controller 102 receives from the sensors 103 information related to the state of the system 101, which is being controlled to achieve one or more objectives. For instance, the system may be a car, the sensors may include GPS, yaw rate and wheel speed sensors, and the objective may be to achieve a desired trajectory, i.e., a sequence of X-Y coordinates. The controller uses the information on the system to compute an appropriate control input 114 to achieve the desired objectives. The control inputs are issued at specific time instants, called controller sampling instants, that are separated by a constant amount of time, called control cycle.

The control input 114 is received by an actuator 103, possibly including an actuator controller and an actuation mechanism, that executes the control input commanded by the controller so that the system input 111 to the system 101 achieves the value indicated by the control input 114 of the controller 102. For instance, in some embodiments, the controlled system 101 is a vehicle, the controller 102 computes a steering angle, which makes the vehicle track the desired trajectory, and the actuator 103 is an electric motor rotating the steering column, resulting in an angle of the vehicle steering wheels to achieve a steering angle equal to value of the control input issued by the controller. In the present disclosure, the term actuator may refer to one or more devices, as for instance the controller can concurrently issue as additional control input a desired acceleration for which the actuator is the engine producing torque to achieve the acceleration value indicated as additional control input.

The actuator behavior in making the system inputs achieve the value of the control inputs is critical for the overall achieving of the control objectives. For instance, if the electric motor is slow in rotating the steering column, the vehicle steering wheel angle may take long time to reach the value indicated by the control input, and, as a consequence, the trajectory executed by the vehicle, may be different from the trajectory expected by the controller when selecting the control input. Thus, even if the control input would cause the vehicle to track the desired trajectory, the actual vehicle trajectory may not do so due to the actuator behavior.

Figure 1B:
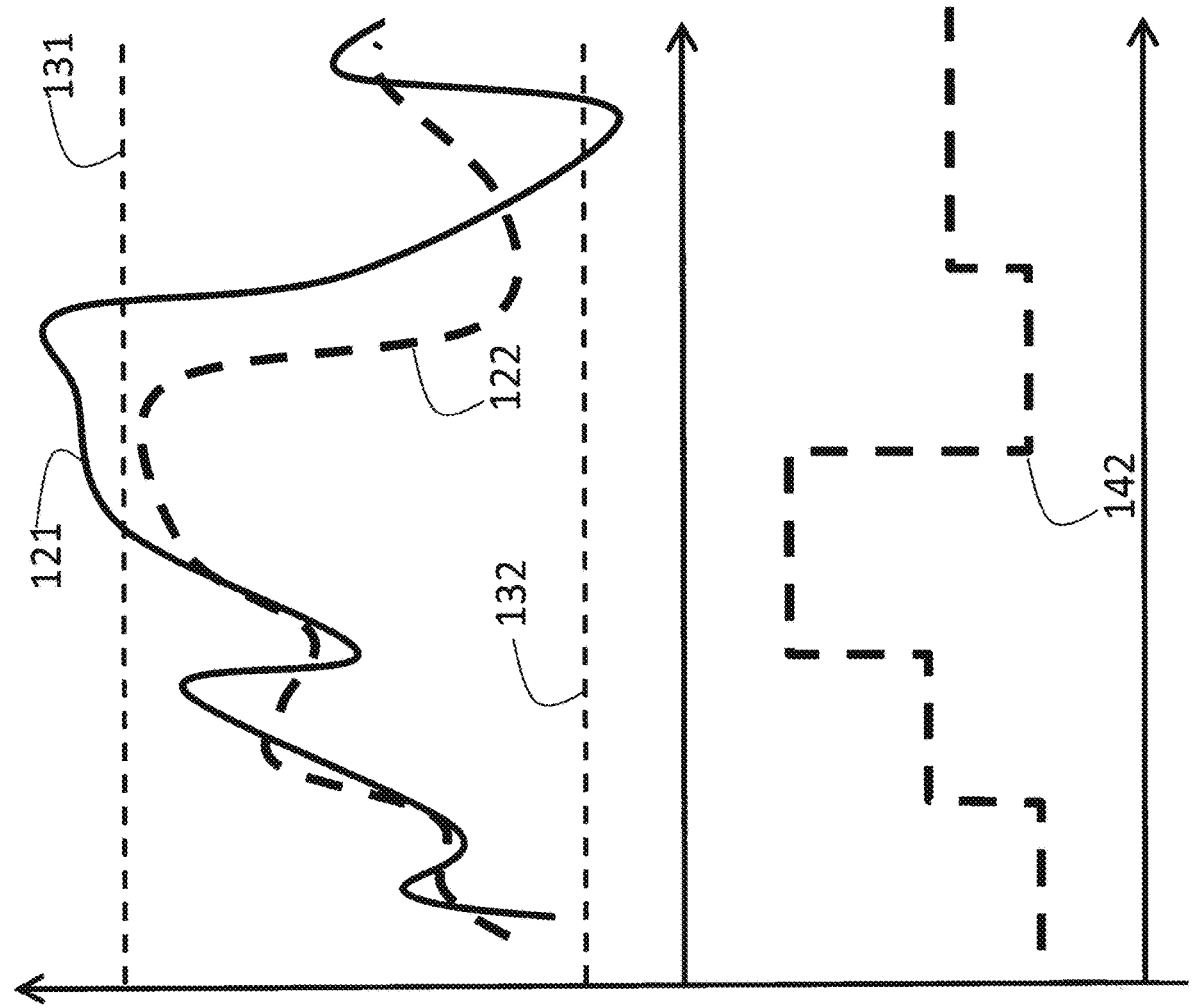
FIG. 1B shows a schematic illustrating a problem of controlling the system subject to constraints without considering behavior of the actuator addressed by some embodiments.

FIG. 1B shows a schematic illustrating a problem of controlling the system subject to constraints without considering behavior of the actuator addressed by some embodiments. For instance, the controller may need to ensure that the trajectory of the vehicle is always on the drivable road, delimited by the boundaries 131, 132. The controller issues a control input 142 that would keep the expected vehicle trajectory 122 on the road if the steering angle were equal to the control input. However, due to the unaccounted response of the actuator in making the steering angle 122 achieve the control input value 142, the actual vehicle trajectory 121 may exit from the drivable road delimited by boundaries 131, 132, with critical consequences.

Some embodiments are based on recognition that this problem can be addressed by making the controller 102 designed for a specific implementation of the actuator 103. For example, the controller 102 can be made aware of the internal dynamics of the actuator and of the evolution of the internal state of the actuator, continuously during the actuator operation. However, this creates some challenges because measuring the internal state of the actuator may require additional sensors, may be proprietary to a third party which does not want to make it available, and may cause more complex computations to be carried out by the controller to compute the control input. This may also cause the need to an extensive re-design of the controller, should the actuator change.

To that end, it is an object of some embodiments to make the controller 102 tunable, i.e., adaptable for different types 104 of the actuator 103. For example, in some embodiments, the controller 102 is adaptable to different types of the motor controlling the steering column of the vehicle. Specifically, one embodiment discloses a controller tunable to different types of the actuators without knowing internal states of the actuators.

Figure 1C:
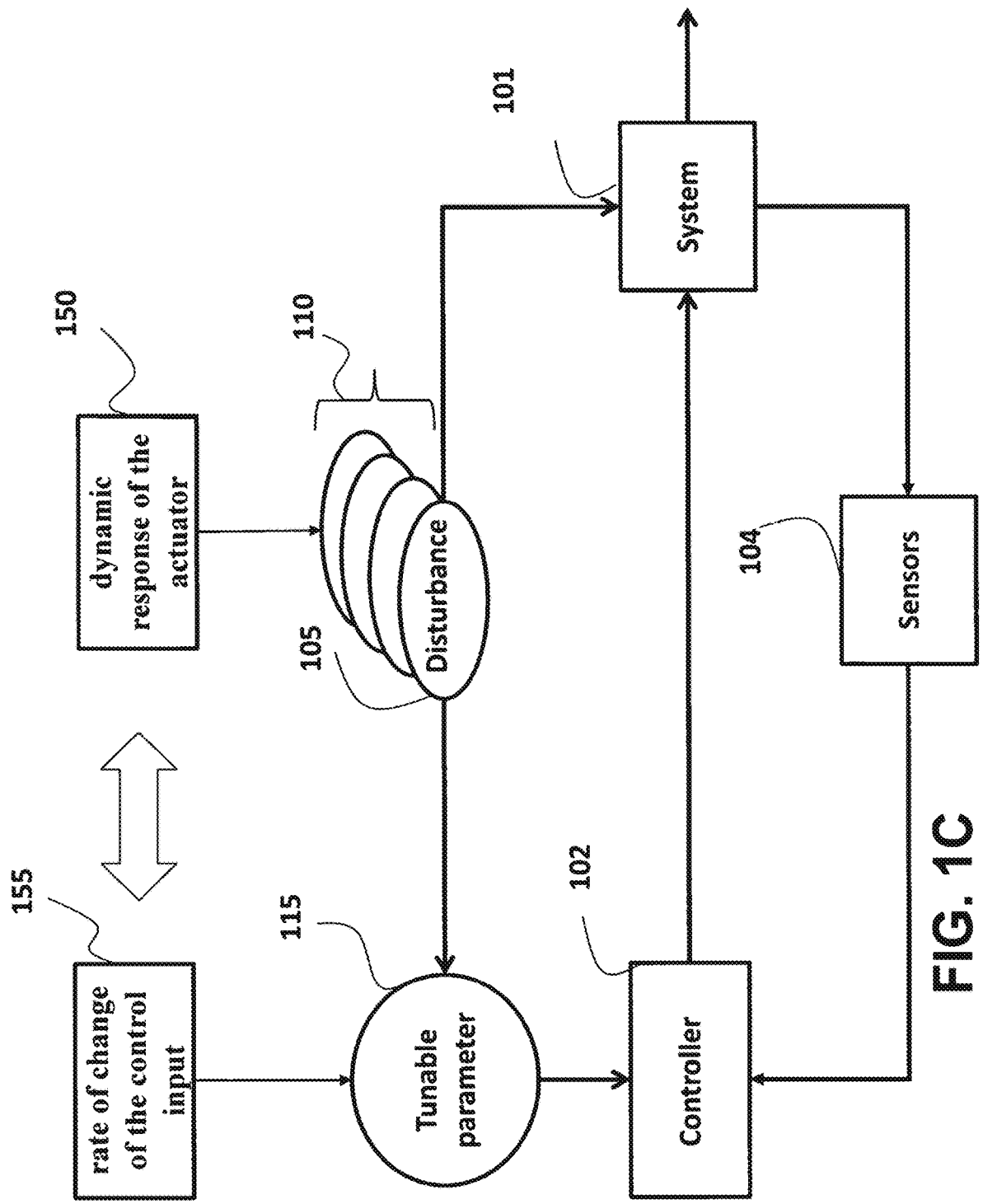
FIG. 1C shows a schematic of some principles used by some embodiments for designing a tunable controller.

FIG. 1C shows a schematic of some principles used by some embodiments for designing a tunable controller. Some embodiments are based on recognition that it is possible to consider an abstract system where the actuator 103 is not included, but instead the controlled system 101 is subject to an additive disturbance 105. Instead of detailed knowledge of the internal dynamics and internal state of the actuator, only a general information on the range of the disturbance is required, which can be served to select a tunable parameter 115 in the controller 102. Different types of actuators cause different disturbance 110 and thereby result in different values of the parameter 115. In such a manner, the tunable parameter 115 acts as a tuning knob adapting the controller to different types of the actuator.

Some embodiments are based on recognition that the disturbance 105 acting on the system 101 is representative of the dynamic response 150 of the actuator, i.e., the relation between the history of input signal to the actuator, being the control input, and the history of output signal of the actuator, being the system input. On the controller side, the tunable parameter 115 can be the maximum rate of change $\Delta u^{max}$ of the control input during the control cycle $\Delta u$, that is, how much the control input u is allowed to change during a control cycle, $$\Delta u(t) = u(t) - u(t-1) \tag{1}$$

$$|\Delta u(t)| \leq \Delta u^{max} \tag{2}$$

where t is the index of the controller sampling instant. This selection of parameter 102 is beneficial because the more the control input is allowed to change, the more is the effort for the actuator in moving the system input from its current value, which should be approximately the previous control input value, to the next value, which is the current control input value. A slow actuator makes a larger error if the change is large, thus indicating that actuators with reduced capabilities should be restricted to small maximum rates, while actuators with better capabilities should be able to tolerate larger maximum rates.

In addition, selection of the rate of change of the control input 155 as a tunable parameter 115 allows to design the controller to be tunable to different types of actuators and to guarantee the enforcement of the system constraints and of the objective of the control, while receiving only a minimal information about the actuator itself.

Figure 2A:
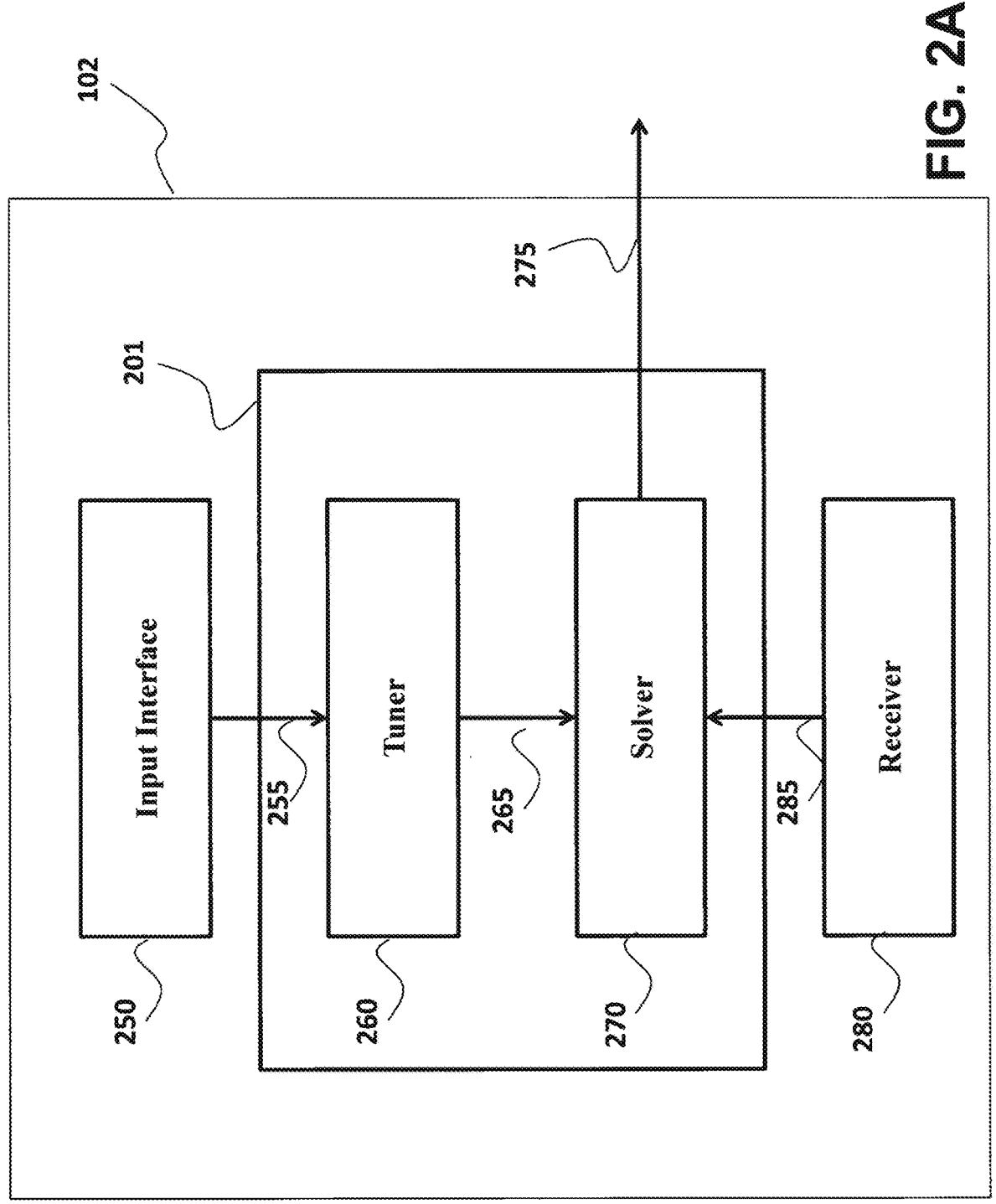
FIG. 2A shows a block diagram of a controller according to some embodiments.

FIG. 2A shows a block diagram of a controller 102 according to some embodiments. The control 102 is configured to control a system by generating a control input 275 to an actuator changing a state of the system in accordance with the control input. The controller 102 includes an input interface 250 configured to receive data 255 indicative of the dynamic response of the actuator, and a tuner 260 configured to determine the maximum rate of change 265 of the control input during a control cycle using the information indicative of dynamic response 255 of the actuator.

The controller 102 also includes a receiver 280 configured to receive measurements 285 of the state of the system, and a solver 270 configured to determine a current value of the control input 275 for controlling the controlled system based on the state of the controlled system 285 subject to constraints on operation of the system and a constraint on the maximum rate of change 265 of the control input. The controller uses the control input 275 to cause the actuator to change the state of the system according to the current value of the control input.

In such a manner, the input interface 250 that receives data or information of the dynamic response of the actuator, the tuner 260 that determines the maximum rate of change of the control input from the received data, and the solver 270 that determines the control input subject to its maximum rate of change allows to tune the controller to different type of actuators without knowing the internal state of the current actuator. The tuner 260 and the solver 270 can be implemented as hardware devices or as software modules executed by a hardware processor 201.

Figure 2B:
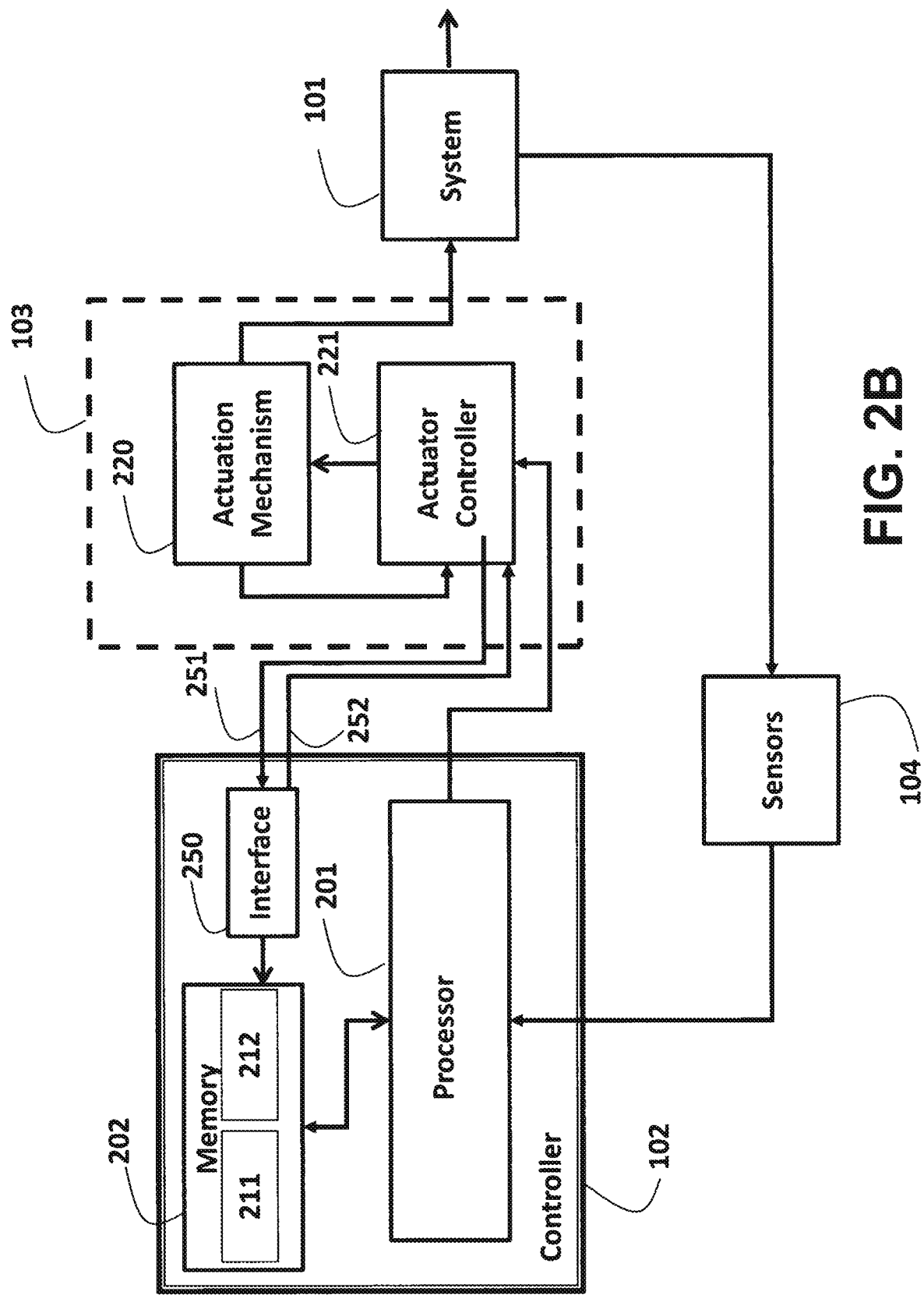
FIG. 2B shows a block diagram of the controller according to one embodiment.

FIG. 2B shows a block diagram of the controller 102 according to one embodiment. The controller 102 includes a processor 201 connected to a memory 202, e.g., a non-transitory computer readable medium. In some implementations, the memory 202 includes a first section 211 for storing information about the controller and the system, such as the system parameter values, the system constraints, the controller execution code, and a second section 212 for storing information indicative of the dynamic response of the actuator, and the selected constraints on the maximum rate of the controller, and possibly additional constraints that ensure the enforcement of the plant constraints. The processor 201 can be any computational device capable of performing computations and can include one or many physical devices of the same or of different types.

Additionally, or alternatively, the processor 201 can include multiple computational devices, e.g., microprocessors. Similarly, the memory 202 can be any logical memory and/or non-transitory computer readable storage medium capable of storing information, and can include one or more physical information storage means, of the same or of different types. The computations performed by the processor 201 are commanded by the program stored in the first section of the memory 211 and use the information on the system and the controller stored in the first section of the memory, 211, the information indicative of the actuator dynamics stored in the second section of the memory, 212, and the information about the system 101 obtained from the sensors 103. The computations performed by the processor 201 result in values of the control inputs that are provided to the actuator 103, which may include an actuation mechanism 220, and an actuator controller 221. The actuator receives the control inputs and operates so that the input to system 101 achieves a value that is equal or close to that of the control input issued by controller 102. For the controller to properly account for the actuator effects on the system operation, the actuator provides information 251 on its dynamic response and/or information indicative thereof through a specific interface 250. The information 251 received from 250 does not involve real-time operation data such as the actuator state but rather information indicative of the actuator's dynamic response. The controller can also optionally to provide information 252 to the actuator, including signaling failure and request for additional information or different information.

Figure 3:
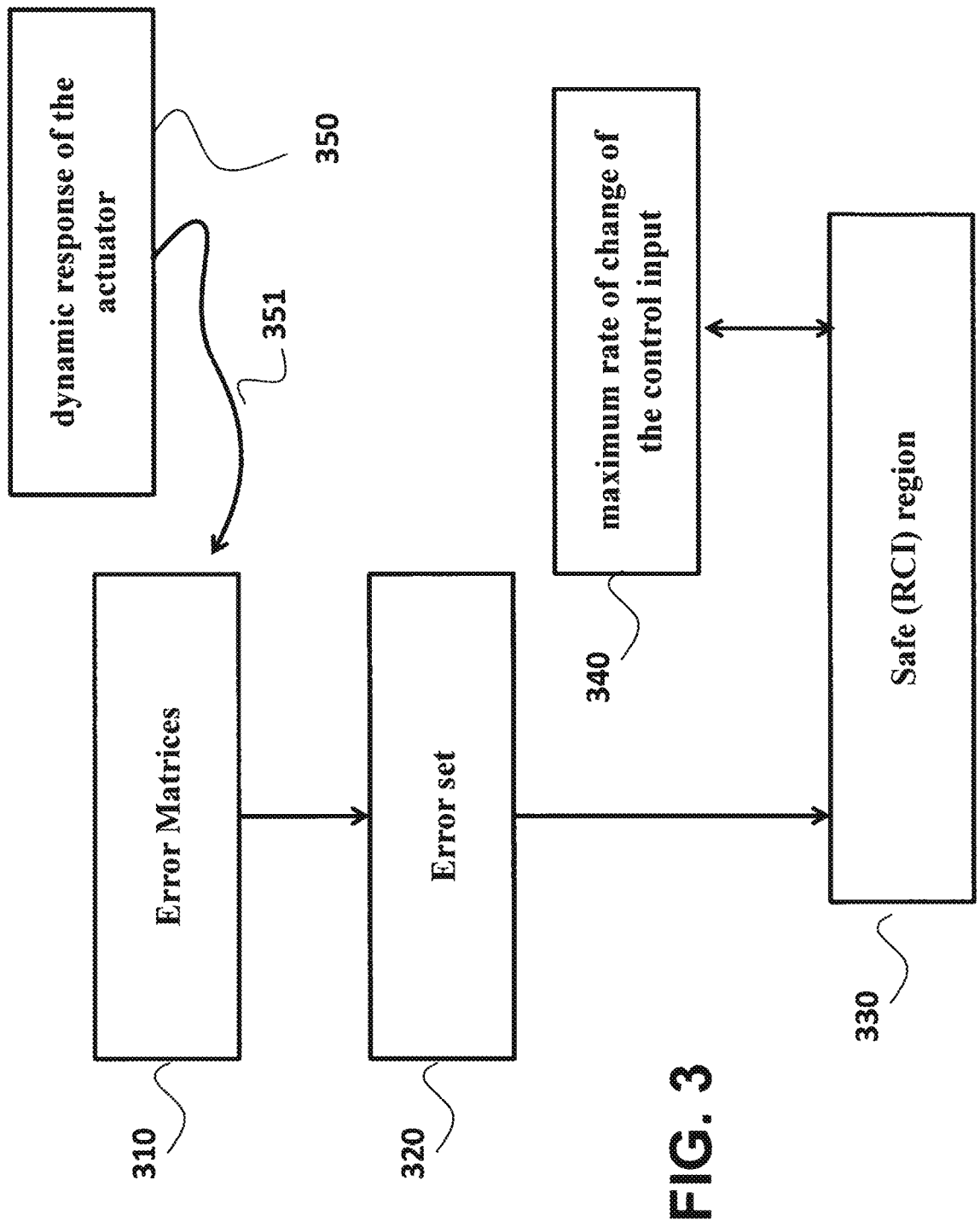
FIG. 3 shows a schematic of different types of data or information indicative of dynamic response of an actuator used by some embodiments to determine maximum rate of change of control inputs.

FIG. 3 shows a schematic of different types of data or information indicative 351 of dynamic response 350 of an actuator used by some embodiments to determine maximum rate of change of control inputs. In one embodiment, the information indicative of dynamic response includes the dynamic response 350 itself. For example, the information 251 can include information indicative of time response of the actuator, such as the time series of the system input in response to a unitary step in the control input $$\{x(t)\}_{t=0}^{M} \qquad (3)$$

or of its frequency response, such as the amplitude and phase frequency data $$\{\|X(\omega)\|, \angle X(\omega)\}_{t=0}^{\omega M} \qquad (4)$$

Additionally, or alternatively, the information indicative 351 of dynamic response 350 of the actuator include one or combination of error matrices 310 representing a localization of the dynamic response at a unitary step. The error matrices 310 include two matrices $M_s$, $M_c$. Matrix $M_s$ is called the transient error gain of the actuator on the system. Matrix $M_c$ is called the cumulative error gain of the actuator on the system.

The transient error gain of the actuator on the system describes the maximum error between the state of the system when the system input is a unitary step, and the state of the system when the system input is provided by the actuator which receives a control input being a unitary step, both starting from a steady state condition.

The cumulative error gain of the actuator on the system describes the maximum error between the system state achieved by an actuator that always starts the control cycle at the desired steady state, and the system state achieved by the actual actuator which starts from any possible steady state achieved by sequences of unitary step changes in the input, when both are subject to the same arbitrary sequence of unitary changes in the control. Notably, the error matrices 310 can be determined from the dynamic response 351 of the actuator, as described below.

Additionally, or alternatively, the information indicative 351 of dynamic response 350 of the actuator include the error set 320 induced by the actuator dynamics, that is, the set of the differences between system states achieved in the ideal case of the system input being equal to the control input, and the actual case, where the relation between the system input and the control input is determined by the dynamic response of the actuator. Notably, the error set 320 can be determined from the error matrices 310, as described below.

Additionally, or alternatively, the information indicative 351 of dynamic response 350 of the actuator include the maximum rate of change of the control input 340 itself to be used as the constraints on the maximum rate of change of the control input that the controller 102 should enforce. Notably, the safe region 320 can be determined from the maximum rate of change of the control input 340.

The error set and the maximum rate of change of the control input can be used to determine one or more safe regions 330 of the system state that ensure that when the state of the system 101 is in the safe region 330, there exist at least one safe control input that guarantees that the system dynamics satisfies the constraints, and the system state remains in the safe region, when the system input is generated as the output of the actuator receiving as input the at least one safe control input.

The information indicative 351 of the dynamic response 350 of the actuator can be determined offline to simplify the online computation controller and/or online to increase adaptability of the controller to variety of actuators.

Figure 4:
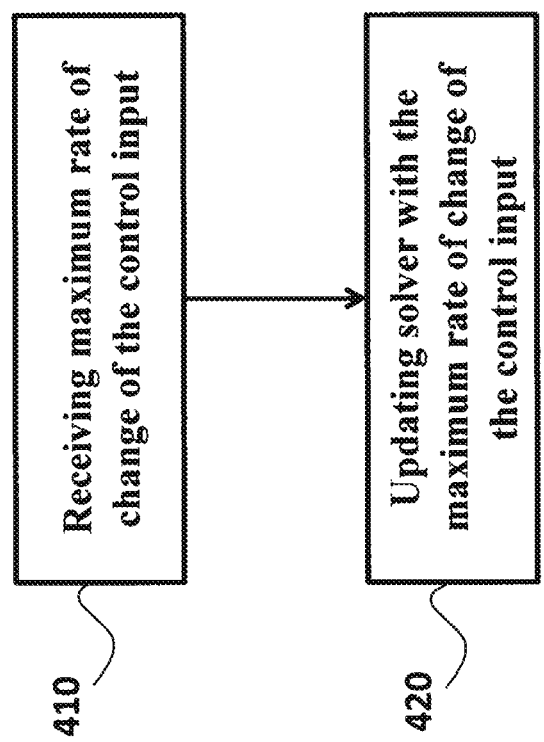
FIGS. 4 and 5 show schematics of using offline determination of the dynamic response of the actuator according to different embodiments.
Figure 5:
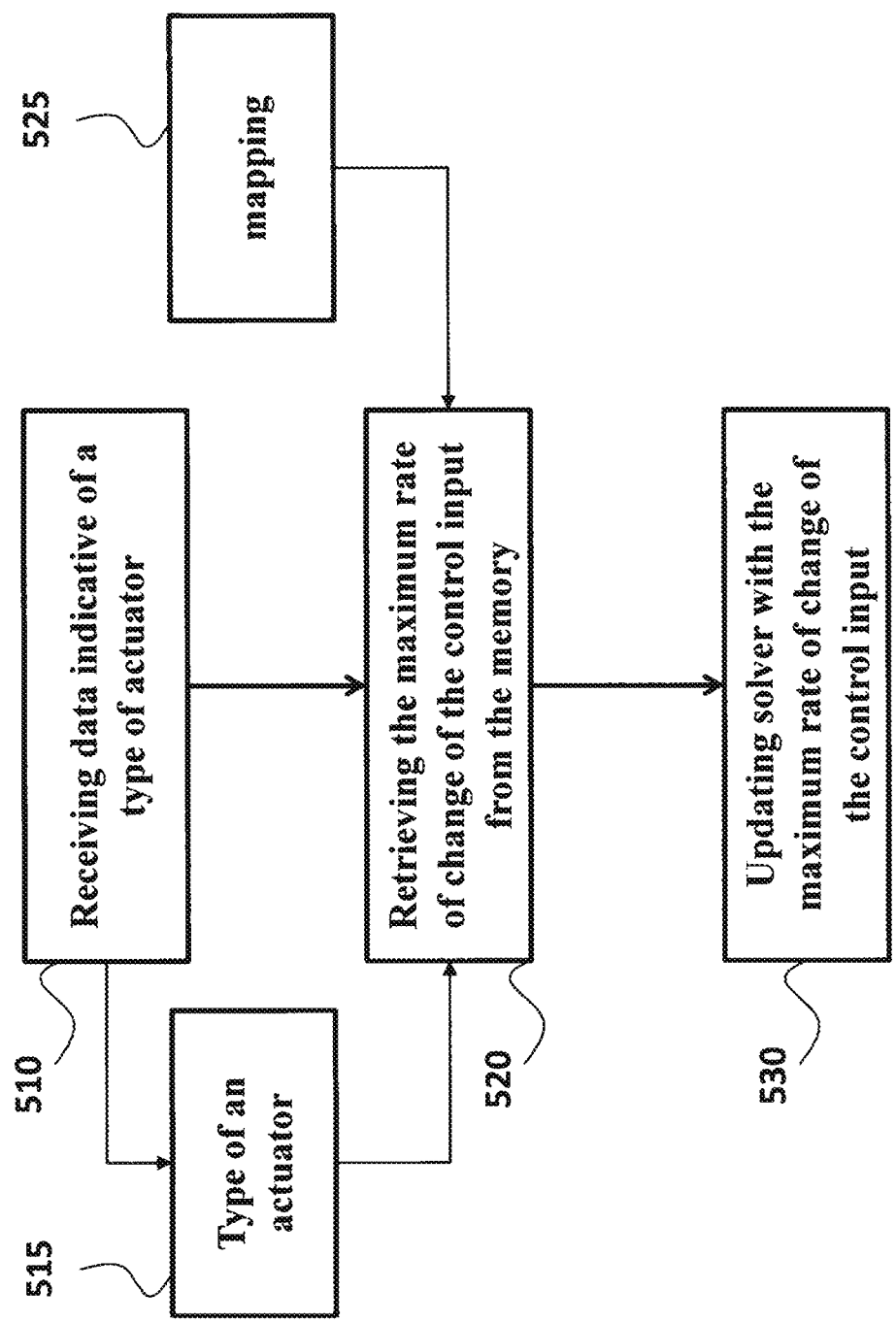

FIGS. 4 and 5 show schematics of using offline determination of the dynamic response of the actuator according to different embodiments. FIG. 4 shows an embodiment when the data received 410 by the interface 250 include a value of the maximum rate of change of the control input, such that the tuner updates 420 the constraint on the maximum rate of change of the control input with the received value of the maximum rate of change of the control input.

FIG. 5 shows a schematic of an embodiment that maps different values of the maximum rate of change of the control input for different types of the actuators and stores those values in a memory, such as memory 202 operatively connected with the processor 201. In this embodiment, the data received 510 by the interface 250 include a type 515 of the actuator 103 actuating the system 101. The embodiment retrieves 520 the maximum rate of change of the control input associated with the received type of the actuator from the mapping 525, and updates 530 the solver with the maximum rate of change of the control input.

The mapping 525 is continuous or discrete. For example, the mapping 525 can map the identification of the actuator to the maximum rate of change of the control input. Such a mapping can be discrete. Additionally, or alternatively, the mapping can be between values of the transient error gain of the actuator on the system per unitary change of the control input and of a cumulative error gain of the actuator on the system per unitary change of the control input, and values of the maximum rate of change of the control input. Such a mapping can also be discrete, but can also be continuous to adapt new types of the actuators without modification of the mapping.

Figure 6:
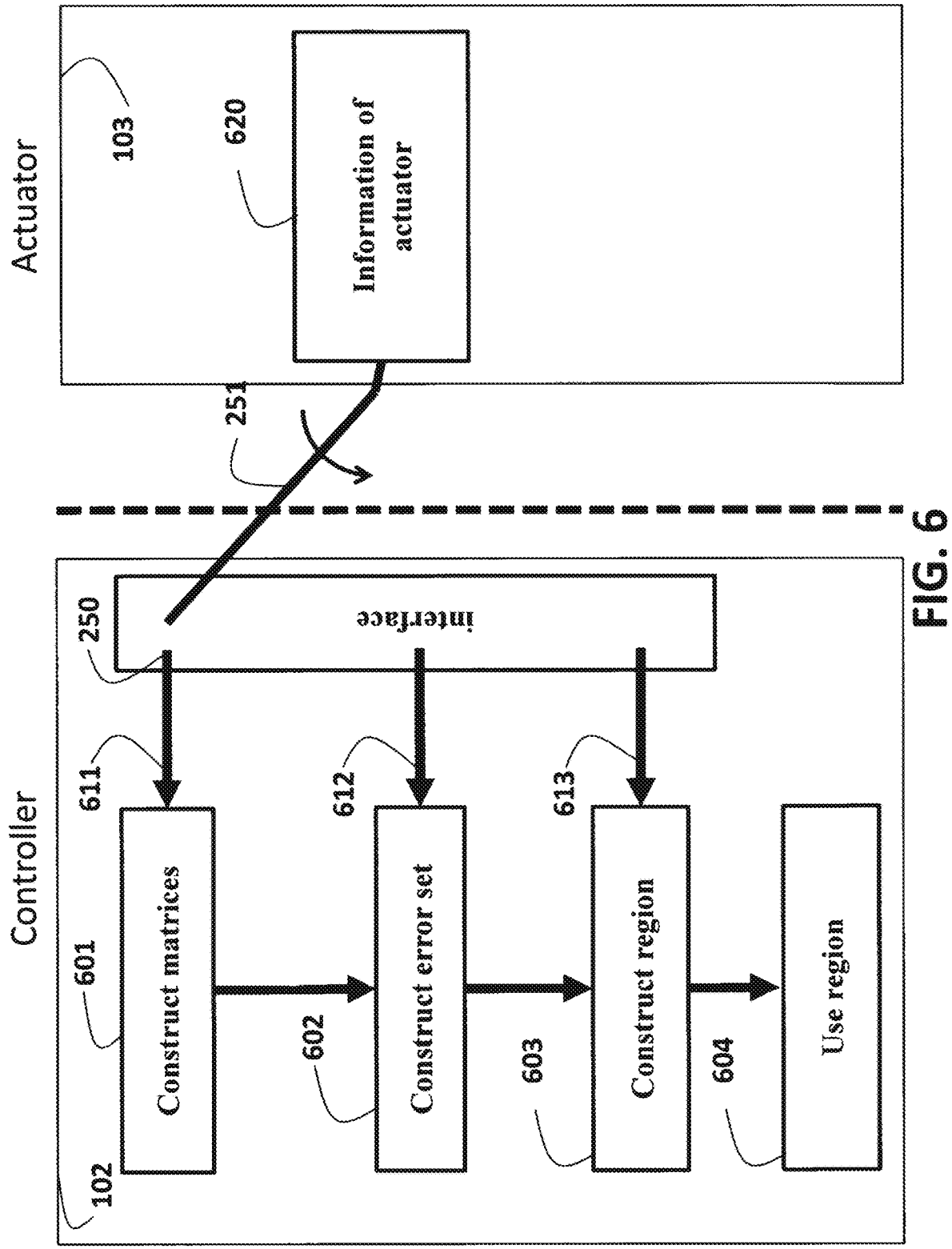
FIG. 6 shows a schematic of online determination of the maximum rate of change of control input according to some embodiments.

FIG. 6 shows a schematic of online determination of the maximum rate of change of control input according to some embodiments. In one embodiment, the principles of this online determination are used by a tuner 260 to make the controller 102 tunable for various types of the actuators including new types entering the market. Additionally, or alternatively, the principles of this online determination are used by some embodiments to produce the mapping 525 and/or determine the maximum rate of change of the control input received 410 through the input interface 250.

The controller uses a state space model of the system, which includes the state update equation $$x(t+1)=f(x(t),u(t)) \quad (5a)$$

where x is the system state, u is the control input, and t is the index of the controller sampling instant. The model may also include an output equation $$y(t)=h(x(t),u(t)) \quad (5b)$$

where y is the system output which is measured by the sensors. Alternatively, the entire state x may be measured or instantaneously reconstructed from measurements.

In one embodiment the model (5a) and, if present, the output equation (5b) are linear, $$x(t+1)=Ax(t)+Bu(t) \quad (6a)$$

$$y(t)=Cx(t)+Du(t) \quad (6b)$$

where A, B, C, D are matrices whose values describe the system dynamics.

The system is subject to constraints on state and inputs, $$x \in \mathcal{X}, u \in \mathcal{U} \quad (7)$$

where $\mathcal{X}$ and $\mathcal{U}$ are regions of the state space and input space where the system operates correctly.

The controller uses the model (5) the constraints (7) and the information indicative of the dynamic response of the actuator, to construct constraints for the rate of change of the control input $$\Delta u(t) \in \mathcal{C}(x(t),u(t)) \quad (8)$$

such if the constraints (8) are satisfied, then the actual system state and the actual system input satisfies constraints (7), i.e., $$x_s \in \mathcal{X}, u_s \in \mathcal{U}, \quad (9)$$

at current time step, and such constraints can be satisfied at any future time step as well. Note that the actual system state and system input may be different from the predicted system state and control input. Also, (9) is based only on the control input u and the system state x, i.e., without exploiting any information on the current actuator state, and the actual system input, The construction of the constraint (8) occurs iteratively based on information indicative of the dynamic response of the actuator as shown in FIG. 6, where the controller 102 receives 251 information 620 of the actuator 103, through the interface 250. The information is processed in different ways according to the type of information received. In the embodiments where the actuator 103 sends 251 the constraint 613 on the maximum rate of change of the input (2), the constraint (8) is determined 603 as a safe region $\mathcal{C}$ of system state and control input space that satisfies the following conditions $$\mathcal{C} \subseteq \mathcal{X} \times \mathcal{U},$$

$$\forall (x,u) \in \mathcal{C}, \exists u: |\Delta u| \le \Delta u_{max}, (f(x,u+\Delta u),u+\Delta u) \in \mathcal{C} \quad (10)$$

The conditions in (10) impose that $\mathcal{C}$ is contained in the region of the system state and control input space where the constraints on system state and control input (7) are satisfied, and that $\mathcal{C}$ is control invariant for inputs that satisfy the constraint on the maximum rate of change of the input. In some of the embodiments of this invention, the safe region $\mathcal{C}$ is chosen to be the largest control invariant region that satisfy the conditions in (10). If no safe region $\mathcal{C}$ exists that satisfies (10), then the controller notifies the actuator of failure 252 and asks for a different constraint on the maximum rate of change of the input.

In the embodiments where the actuator sends 251 the matrices $M_s$, $M_c$ 612, the constraint (8) is determined by first 602 selecting a value for maximum rate of change $\Delta u^{max}$, then construct an error set induced by the actuator dynamics $$W = \quad (11)$$

$$\left\{ \tilde{x} : \exists \Delta u \in \Delta \mathcal{U}, |\tilde{x}| = \sum_{j=1}^{m_p} [M_c]^j \max_{\Delta \mathcal{U}} ||[\Delta u]_j|| + [M_s]^j \max_{\Delta \mathcal{U}} |[\Delta u]_j| \right\}$$

where $\Delta U = \{\Delta u : |\Delta u(t)| \le \Delta u^{max}\}$ and then constructing 603 a safe region $\mathcal{C}$ of system state and control input space that satisfies the following conditions $$\mathcal{C} \subseteq \mathcal{X} \times \mathcal{U},$$

$$\forall (x,u) \in \mathcal{C}, \exists \Delta u : |\Delta u| \le \Delta u^{max}, (f(x,u+\Delta u)+w,u+\Delta u) \in \mathcal{C}, \forall w \in W \quad (12)$$

The conditions in (12) determine $\mathcal{C}$ to be contained in the region of the system state and control input space where the constraints on system state and control input (7) are satisfied, and to be robust control invariant for inputs that satisfy the constraint on the maximum rate of change of the input to all errors caused by the actuator having a non-ideal response. In some of the embodiments of this invention, the safe region $\mathcal{C}$ is chosen to be the largest region that satisfy the conditions in (12). If no safe region $\mathcal{C}$ exists that satisfies (10) then the controller chooses a different value for maximum rate of change $\Delta u^{max}$. In some embodiments of the present invention the controller searches for a maximum rate of change $\Delta u^{max}$ such that a set of target steady state values for system state and control input $\mathcal{R}$ for the system state can be achieved. In particular, the controller checks for a set $\mathcal{C}$ that satisfies (12) and such that $\mathcal{R} \subseteq \mathcal{C}$. The controller continues to adjust $\Delta u^{max}$ until such condition holds. In particular, if such condition does not hold, the controller reduces $\Delta u^{max}$ until it holds.

In the embodiments where the actuator sends 251 information indicative of the actuator time response or frequency response 611, the controller uses this information to first build a model of the actuator dynamics $$\dot{x}_a(t) = A_a x_a(t) + B_a u_a(t)$$

$$y_a(t) = C_a x_a(t) + D_a u_a(t) \quad (13)$$

for instance, by using standard system model identification methods.

Then, the controller uses the actuator dynamics (13) to compute the matrices $M_s$, $M_c$ as follows. $M_s$ provides information on the error on the response of the system state between the case of an actuator with ideal, i.e., infinitely fast, dynamics, and the response of the system state with the actuator model (13). For the case of linear system dynamics (6) and linear actuator dynamics (13) the computation is $$M_s = \left| \int_0^{T_s} e^{A_p(T_s-\tau)} B_p \left( I - C_a \cdot \int_0^{\tau} e^{A_a(\tau-\sigma)} B_a d\sigma \right) d\tau \right| \quad (14)$$

where $$\dot{x}(t) = A_p x(t) + B_p u(t)$$

$$y(t) = C_p x(t) + D_p u(t) \quad (15)$$

is a continuous time formulation of (5)

The matrices $M_s$, $M_c$, are used to compute the set (11) of possible errors induced by the actuator dynamics, which is then used to construct a safe region $\mathcal{C}$ of system state and control input space that satisfies the conditions (12).

$M_c$ provides information on the maximum offset at the beginning of a control cycle between the expected value of the control input and the actual value of the system input and for the case of linear system dynamics (6) and linear actuator dynamics (13) is computed as follows $$M_c = \sum_{i=1}^{n_p} \|[\delta x_a(\cdot)^{(u)}]_i\|_\infty \left| \int_0^{T_s} e^{A_p(T_s-\tau)} B_p C_a e^{A_a \tau} e_i d\tau \right| \quad (16)$$

$$\|[\delta x_a(\cdot)^{(u)}]_i\|_\infty = \sum_{j=1}^{m_p} \sup_{\|[\Delta u(\cdot)]_j\|_\infty = 1} \frac{\|[\tilde{y}_a(\cdot)]_i\|_\infty}{\|[\Delta u(\cdot)]_j\|_\infty}$$

$$\tilde{y}_a(k) = x_a(k) - (I - \overline{A}_a)^{-1} \overline{B}_a u_a(k)$$

where $n_p$ is the number of system states, $m_p$ is the number of system inputs and $e_i$ is the $i^{th}$ unitary vector, i.e., the element of the standard basis of a space of dimension n>i.

The safe region $\mathcal{C}$ is used 604 in the controller as follows. At any time, the controller receives the information about the state of the system x(t), yet, no information about the actuator state, $x_a(t)$. The controller then solves the optimization problem $$\min_{\Delta u_t^{(N)}} F(x_{N|t}) + \sum_{h=0}^{N-1} L(x_{h|t}, \Delta u_{h|t}) \quad (17)$$

$$\text{s.t. } x_{h+1|t} = f(x_{h|t}, \Delta u_{h|t})$$

$$x_{0|t} = x$$

$$\Delta u_{h|t} \in C_{\Delta u}(x_{h|t}, u_{h|t})$$

$$x_{N|t} \in \mathcal{X}_N$$

Where $$C_{\Delta u}(x,u) = \{\Delta u \in \Delta U : (f(x, u+\Delta u) + w, u+\Delta u) \in \mathcal{C}, \forall w \in W\} \quad (18)$$

and $\mathcal{W}$ is defined by (11) for $\mathcal{C}$ that satisfies conditions (12), while $\mathcal{W} = \{0\}$ for $\mathcal{C}$ that satisfies conditions (10).

From the solution $\Delta u_t^{(N)*} = (\Delta u_{0|t}^* \ldots \Delta u_{N-1|t}^*)$ of (17), the controller selects the control input for the actuator as $$u(t) = u(t-1) + \Delta u_{0|t}^*.$$

In some embodiments of the present invention the cost function in (17) is quadratic $$F(x) = x'Px, \quad L(x, \Delta u) = x'Qx + \Delta u' R \Delta u, \quad (17b)$$

where P and R are symmetric positive definite matrices, and Q is a symmetric and positive semidefinite matrix. In some embodiments of the present invention the terminal set in (17) is polyhedral $\mathcal{X}_N = \{x : H_N x \leq K_N\}$. Furthermore, in some embodiments of the present invention the prediction horizon N is chosen such that for every $(x, u) \in \mathcal{C}$ there exists at least one sequence $\Delta u_t^{(N)}$ such that initializing (4) from x and u, and applying $\Delta u_t^{(N)}$, results in the state after N steps to be in the terminal set, $x_N \in \mathcal{X}_N$.

Figure 7A:
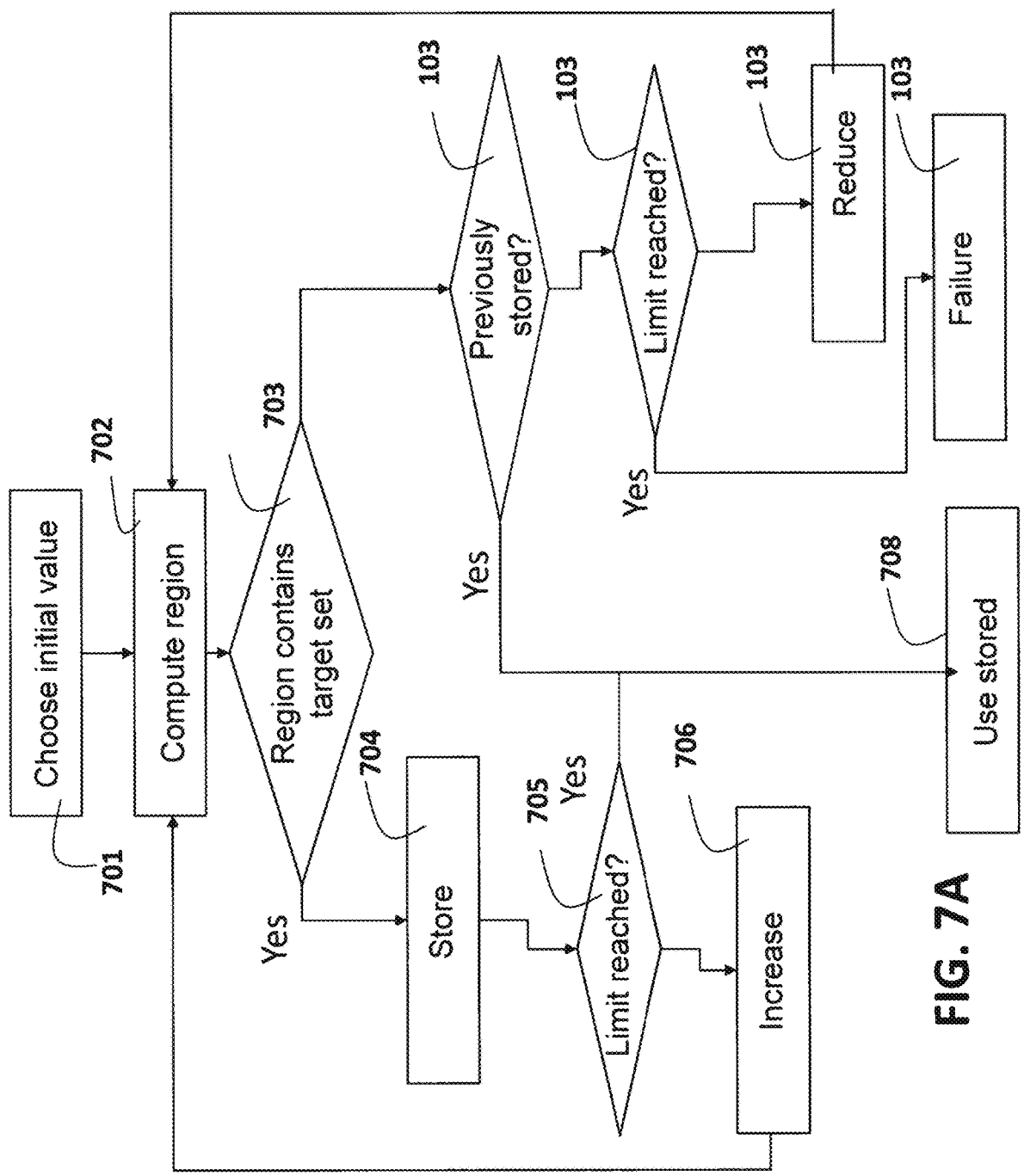
FIG. 7A shows a flow chart of a method for determining a safe region and/or the corresponding of maximum rate of change according to some embodiments.

FIG. 7A shows a flow chart of a method for determining a safe region $\mathcal{C}$ and/or the corresponding of maximum rate of change $\Delta u^{max}$ according to some embodiments. In these embodiments, the tuner is configured to iteratively update the maximum rate of change of the control input until a target set of states of the system governed by the actuator is included into a safe region being a control invariant set of states of the system governed by the actuator that satisfies the constraints of operation of the system. Notably, the size of the control invariant set is a function of the transient error gain of the actuator and of the cumulative error gain of the actuator, and the response of the actuator is a function of the maximum rate of change of the control input.

The largest region $\mathcal{C}$ that satisfies conditions in (10) or (12) can be constructed as the fixed point of a sequence of backward reachable region. In particular, some implementations compute $$\mathcal{C}^{(0)} = \mathcal{X} \times \mathcal{U}$$

$$\mathcal{C}^{(i+1)} = \{(x,u) \in \mathcal{C}^{(i)} : \exists \Delta u, |\Delta u| \leq \Delta u^{max}, f(x, u+\Delta u) + w \in \mathcal{C}^{(i)}, \forall w \in \mathcal{W}\} \quad (19)$$

until reaching a fixed point, i.e., until i* such that $\mathcal{C}^{(i*)} = \mathcal{C}^{(i*-1)}$. Then, $\mathcal{C} = \mathcal{C}^{(i*)}$.

Figure 7B:
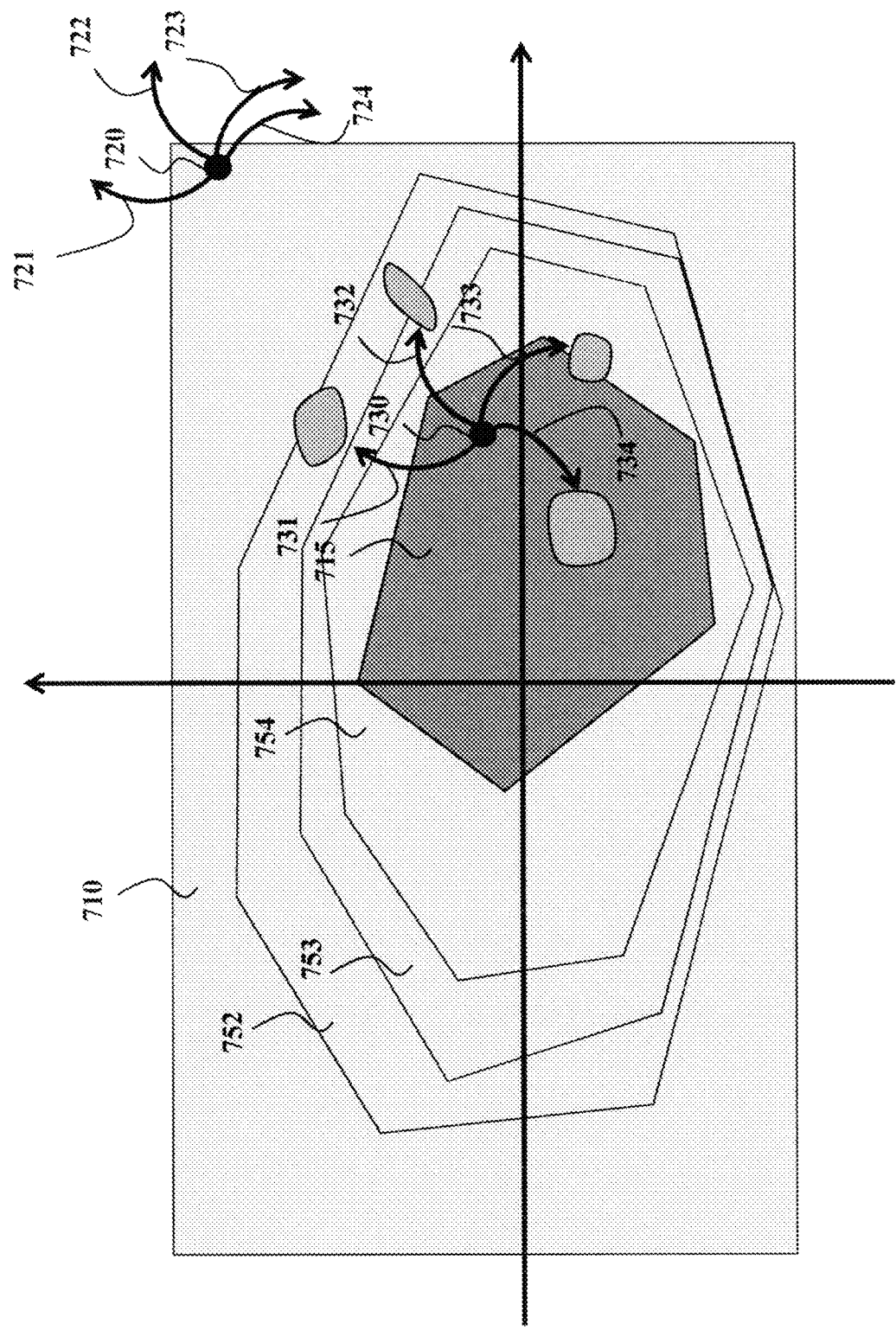
FIG. 7B shows an example of a two-dimensional initial region defined as the feasible regions of constraints according to some embodiments.

FIG. 7B shows an example of a two-dimensional initial region $\mathcal{C}^{(0)}$ 710 defined as the feasible regions of constraints (7) according to some embodiments. For linear equations (6a), (6b), subject to linear constraints (7), the initial region is a multi-dimensional polytope in the space of the states of the vehicle and states of the desired trajectory determined by hyperplanes, which are represented by linear inequalities.

Because the system has dynamics, and it is affected by the dynamic response of the actuator, being in the feasible region of the constraints (7) at a certain time does not by itself guarantee that they can be maintained in the feasible region at the next time. For example, the system state can be in the feasible region at one iteration, but all control actions 721-724 can bring the state of the system outside of the feasible region.

However, the iteration (19) constructs a sequence of regions $\mathcal{C}^{(1)}$ 752, $\mathcal{C}^{(2)}$ 753, $\mathcal{C}^{(3)}$ 754 of shrinking size, until the fixpoint $\mathcal{C}^{(i*)}$ 715 is achieved, which is selected as safe region. For any state 730 in such a safe region such 715 and within all possible control actions 731-734 that the controller can execute, there is at least one control action 734 that maintains the state of the system within the safe region 715. Also, since the safe region 715 is obtained by shrinking the feasible region 710, the constraints (7) can always be satisfied in the safe region.

For example, one embodiment selects 701 an initial value for $\Delta u^{max}$ and computes 702 the safe region $\mathcal{C}$ for the selected initial value. If 703 the region $\mathcal{C}$ can be computed and is such that contains a desired set of target steady state values for system state and control input $\mathcal{R}$, i.e., $\mathcal{R} \subseteq \mathcal{C}$ then the safe region $\mathcal{C}$ is stored 704, and any previously stored safe region is discarded. Then, if the upper limit of $\Delta u^{max}$ 705 is not reached, $\Delta u^{max}$ is increased 706 otherwise the previously stored safe region is used 708. If 703 the safe region $\mathcal{C}$ cannot be computed or is such that does not contain a desired that a set of target steady state, the controller checks 707 if a safe region $\mathcal{C}$ was previously stored. If so, the iteration terminates and the stored $\mathcal{C}$ is used 708 in the controller, otherwise if 709 the limit is not reached, $\Delta u^{max}$ is decreased and the iteration continues. If the lower limit of $\Delta u^{max}$ is reached, the iteration terminates with failure that is notified to actuator via 252, requesting a change in information.

Construction of Error Set in the Actuator

Additionally, or alternatively, in some embodiments, the controller and the actuator determine the maximum rate of change jointly. These embodiments allow flexibility of online determination while reducing amount of private information shared by the actuator.

Figure 8:
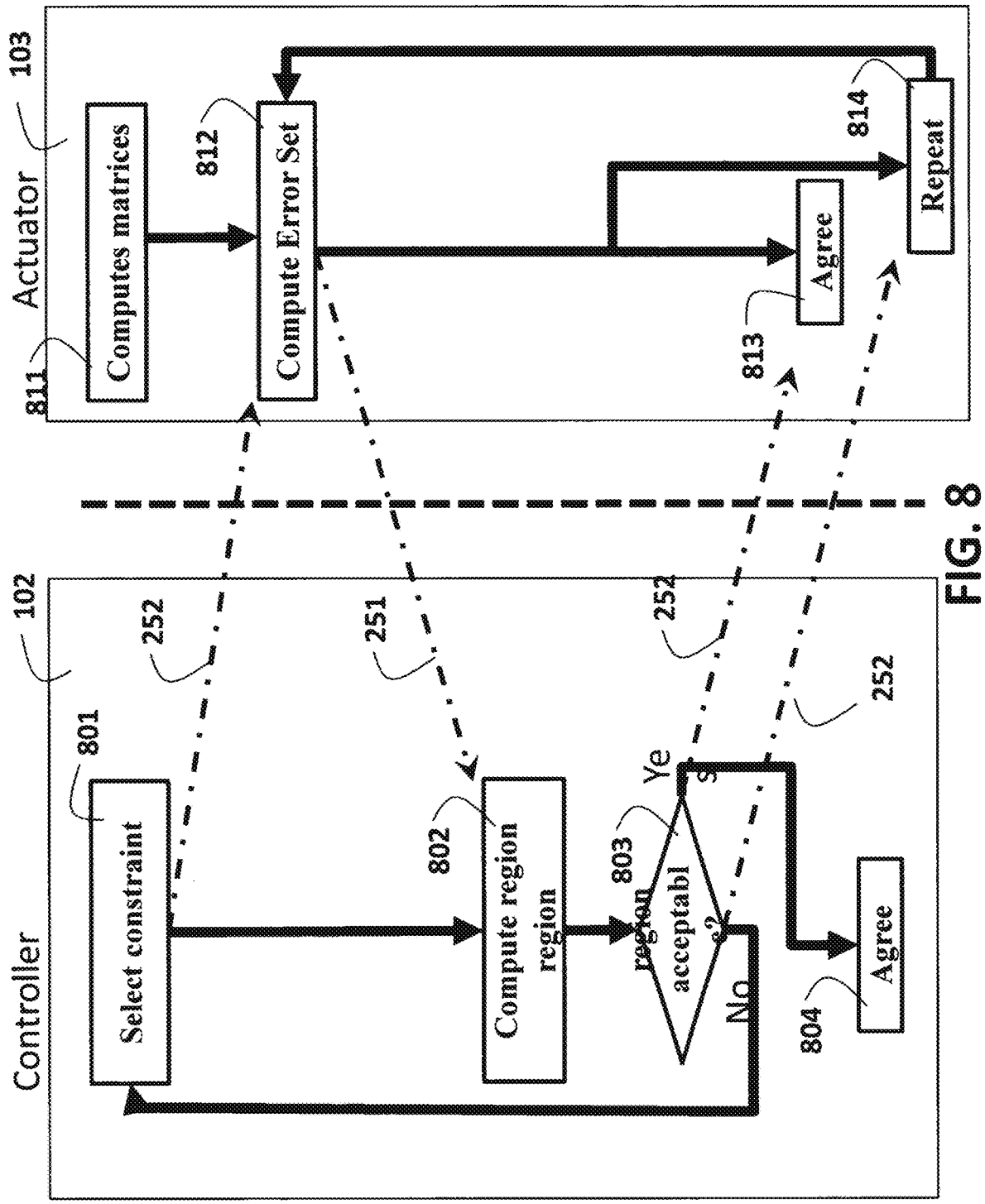
FIG. 8 shows a schematic of information exchange between the controller and the actuator according to some embodiments.

FIG. 8 shows a schematic of information exchange between the controller and the actuator according to some embodiments. The controller first provides to the actuator a proposed constraint on the maximum rate of change of the control input that the controller plans to enforce, the actuator responds with a set of errors induced by the actuator internal dynamics, and the controller decides whether the combination is acceptable, or makes a different proposal.

For example, the controller provides 801 the proposed value for $\Delta u^{max}$ by 252. The actuator computes 811 matrices $M_s$, $M_c$, for instance using (14) and (16), and use them to compute 812 the error set $\mathcal{W}$ induced by the actuator dynamics, for instance by (11). The error set $\mathcal{W}$ is provided to the controller by 251, and the controller uses it to compute the safe region $\mathcal{C}$ for instance by (19). If 803 the safe region $\mathcal{C}$ can be computed and it is such that it contains a desired that a set of target steady state values for system state and control input $\mathcal{R}$, i.e., $\mathcal{R} \subseteq \mathcal{C}$ then the controller communicates to actuator agreement 804, by 252, and the actuator also agree 813 If 803 the safe region $\mathcal{C}$ cannot be computed or it is such that it does not contain a desired that a set of target steady state, the controller indicates disagreement by 252, and selects a new constraint on the maximum rate of change of the control input, for instance as described in FIG. 7, and the actuator repeats 814 the iteration. In such a manner, the computation of $\Delta u^{max}$ can be iterative. The realization is that, especially for a system that is asymptotically stable, reducing $\Delta u^{max}$ increases the range of target equilibria that can be attained by the system.

Figure 9:
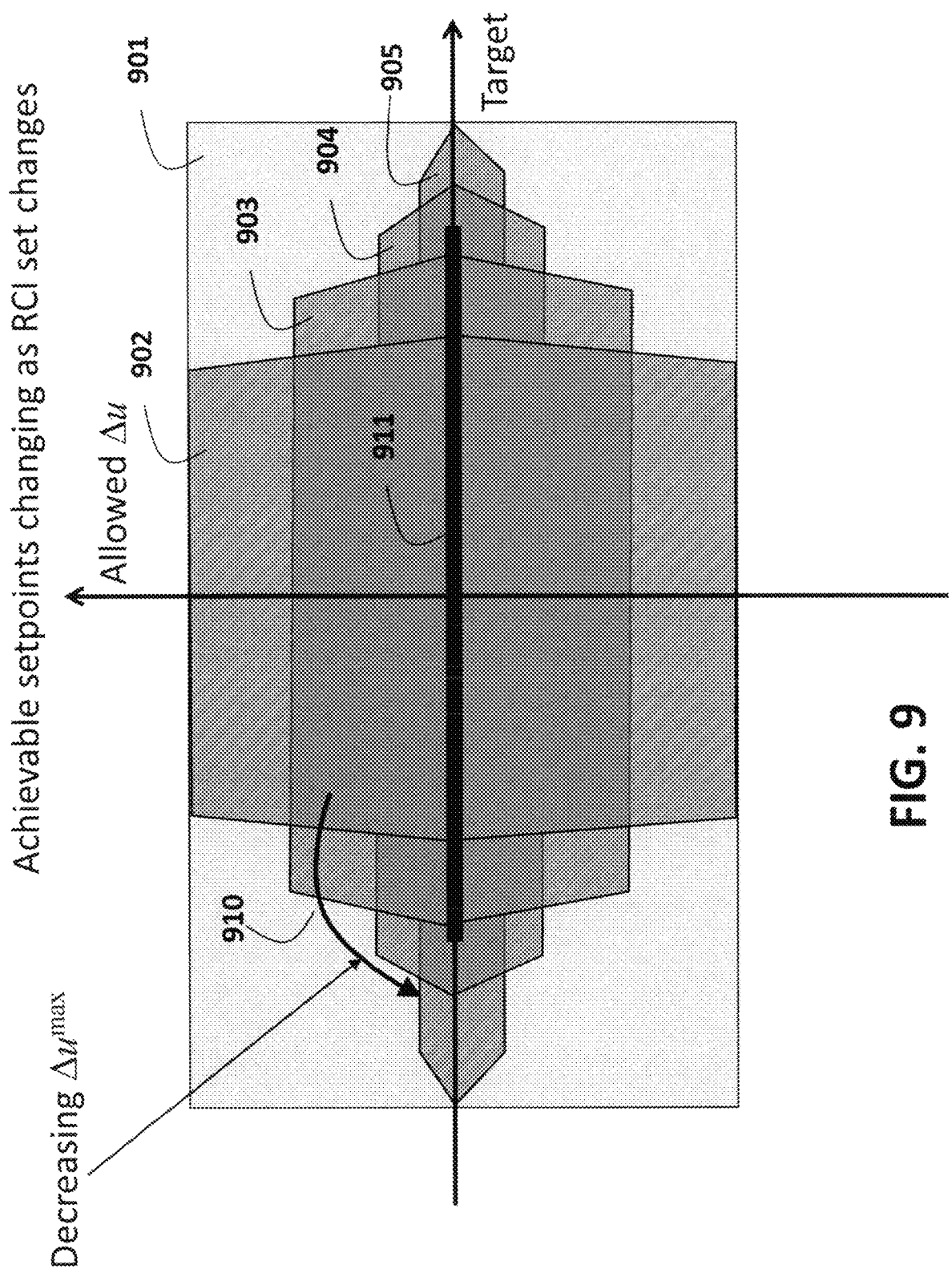
FIG. 9 shows several sections of safe regions iteratively computed according to some embodiments.

FIG. 9 shows several sections of safe regions iteratively computed according to some embodiments. For instance, FIG. 9 shows 901 the allowed state region $\mathcal{X}$, and a sequence 902, 903, 904, 905 of safe regions $\mathcal{C}$, computed for decreasing 910 values of $\Delta u^{max}$. The safe region used in the controller can be selected as the safe region in the sequence that contained a desired set 911 of target steady state values, and allows for faster motion of the system, that is, has largest value $\Delta u^{max}$. For instance, in FIG. 9, 904, 905 are acceptable with respect to 911, while 902, 903 are not, and among those that are acceptable, 904 has largest value $\Delta u^{max}$ and hence will be selected.

Some embodiments are based on realization followed from Equation (11) that the error set increases when Au increases. Furthermore, Au decreases when the control input rate weight, for instance R in (17b), increases. Thus, in order to reduce the impact of the actuator dynamics on the performance of the system, some embodiments design the controller with large smallest eigenvalue of the control input rate weight matrix. In addition, by continuing to increase the smallest eigenvalue of the control input rate weight, the eigenvalue value used in the controller makes the system to achieve a desired target eventually with no error.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

What is claimed is:

1. A controller configured to control a system by generating a control input to an actuator changing a state of the system in accordance with the control input, comprising:
    an interface configured to receive data indicative of dynamic response of the actuator;
    a tuner configured to determine the maximum rate of change of the control input to the actuator during a control cycle using the received data indicative of dynamic response of the actuator;
    a receiver configured to receive measurements of the state of the system;
and
    a solver configured to determine a current value of the control input for controlling the controlled system based on the state of the controlled system in accordance with a model of the system subject to constraints on operation of the system and a constraint on the maximum rate of change of the control input, and to cause the actuator to change the state of the system according to the current value of the control input.

2. The controller of claim 1, wherein the tuner updates the constraint on the maximum rate of change of the control input without knowledge of internal state of the actuator.

3. The controller of claim 1, wherein the received data include a value of the maximum rate of change of the control input, such that the tuner updates the constraint on the maximum rate of change of the control input with the received value of the maximum rate of change of the control input.

4. The controller of claim 1, further comprising:
    a memory configured to store a mapping between values of the data indicative of dynamic response of the actuator and values of the maximum rate of change of the control input, wherein the mapping is continuous or discrete, wherein the tuner is configured to map the received value of the data indicative of dynamic response of the actuator to a value of the maximum rate of change of the control input using the mapping to produce the constraint on the maximum rate of change of the control input.

5. The controller of claim 4, wherein the received data include a transient error gain of the actuator on the system per unitary change of the control input and a cumulative error gain of the actuator on the system per unitary change of the control input, such that the tuner maps the constraint on the maximum rate of change of the control input from the received values of the transient error gain of the actuator and the cumulative error gain of the actuator.

6. The controller of claim 5, wherein the received data includes the value of the transient error gain of the actuator and of the cumulative error gain of the actuator, a type of the actuator specifying the value of the transient error gain of the actuator and of the cumulative error gain of the actuator, or combination thereof.

7. The controller of claim 1, wherein the received data include a transient error gain of the actuator on the system per unitary change of the control input and of a cumulative error gain of the actuator on the system per unitary change of the control input, such that the tuner determines the constraint on the maximum rate of change of the control input from the received values of the transient error gain of the actuator and the cumulative error gain of the actuator.

8. The controller of claim 7, wherein the tuner is configured to iteratively update the maximum rate of change of the control input until a target set of states of the system governed by the actuator is included into a safe region, being a control invariant region, of states of the system governed by the actuator that satisfies the constraints of operation of the system, wherein a size of the safe region is a function of the transient error gain of the actuator and of the cumulative error gain of the actuator, and wherein the response of the actuator is a function of the maximum rate of change of the control input.

9. The controller of claim 7, wherein the transient error gain of the actuator is a function of a difference between the state of the system at the end of the control cycle for a unitary input applied through the actuator, and the state of the system at the end of one control cycle for the unitary input applied directly to the system.

10. The controller of claim 7, wherein the cumulative error gain of the actuator is a function of a largest difference between the state of the system at the end of any control cycle for any sequence of unitary input applied through the actuator, and the state of the system at the end of the same control cycle for the same sequence unitary input applied directly to the system.

11. The controller of claim 7, wherein the tuner determines different values of the maximum rate of change of the control input for different types of actuators governing the state of the system, thereby making the controller tunable to different types of the actuators without knowing internal states of the actuators.

12. The controller of claim 11, wherein the data of the dynamic response of the actuator is one or a combination of data of the frequency response of the actuator to step changes of the controller input and of data of the time response of the actuator to step changes of the controller input.

13. The controller of claim 7, wherein the transient error gain of the actuator on the system per unitary change of the control input and the cumulative error gain of the actuator on the system are determined by data of the dynamic response of the actuator.

14. The controller of claim 1, wherein the tuner updates the maximum rate of change of the control input until a target set of states of the system governed by the actuator is included into a control invariant set of states of the system governed by the actuator that satisfies the constraints of operation of the system, wherein for each iteration, the tuner is configured to
select a rate of change of the control input;
receive an error set indicative of the difference between the state of the system when the control input is equal to the system input, and the state of the system when the system input is determined by the dynamic response of the actuator to the control input, for the selected rate of change of the control input;
determine a safe region of states of the system for bounded by the received error set;
test if the safe region includes the target set of states of the system.

15. The controller of claim 1, wherein the controller uses the largest of the smallest eigenvalue of the control input rate weight matrix.

16. A method to control a system by generating a control input to an actuator changing a state of the system in accordance with the control input, wherein the method uses at least one processor coupled with stored instructions implementing the method, wherein the instructions, when executed by the processor carry out steps of the method, comprising:
receiving data indicative of dynamic response of the actuator;
determining the maximum rate of change of the control input to the actuator during a control cycle using the data indicative of dynamic response of the actuator;
receiving measurements of the state of the system;
determining a current value of the control input for controlling the controlled system based on the state of the controlled system in accordance with a model of the system subject to constraints on operation of the system and a constraint on the maximum rate of change of the control input; and
causing the actuator to change the state of the system according to the current value of the control input.

17. The method of claim 16, wherein the received data include a value of the maximum rate of change of the control input, such that the maximum rate of change of the control input is updated with the received value of the maximum rate of change of the control input.

18. The method of claim 16, wherein the received data include a transient error gain of the actuator on the system per unitary change of the control input and of a cumulative error gain of the actuator on the system per unitary change of the control input, such that the constraint on the maximum rate of change of the control input is determined from the received values of the transient error gain of the actuator and the cumulative error gain of the actuator.

19. The method of claim 16, wherein the constraint on the maximum rate of change of the control input is determined using a mapping between the received data and values of the rate of change of the control input.

20. A non-transitory computer readable storage medium embodied thereon a program executable by a processor for performing a method, the method comprising:
receiving data indicative of dynamic response of the actuator;

determining the maximum rate of change of the control input to the actuator during a control cycle using the data indicative of dynamic response of the actuator;

receiving measurements of the state of the system;

determining a current value of the control input for controlling the controlled system based on the state of the controlled system in accordance with a model of the system subject to constraints on operation of the system and a constraint on the maximum rate of change of the control input; and causing the actuator to change the state of the system according to the current value of the control input.

* * * * *